April 12, 1966 R. L. ROST 3,245,629

TAPE RECORDER

Original Filed July 10, 1961 2 Sheets-Sheet 1

INVENTOR.
Richard L. Rost
BY John J. Pederson
Atty.

April 12, 1966 R. L. ROST 3,245,629

TAPE RECORDER

Original Filed July 10, 1961 2 Sheets-Sheet 2

INVENTOR.
Richard L. Rost

BY John J. Pederson
Atty.

3,245,629
TAPE RECORDER

Richard L. Rost, Barrington, Ill., assignor to Zenith Radio Corporation, Chicago, Ill., a corporation of Delaware Application Sept. 3, 1963, Ser. No. 305,968, which is a division of application Ser. No. 122,916, July 10, 1961, now Patent No. 3,105,645, dated Oct. 1, 1963. Divided and this application Dec. 16, 1964, Ser. No. 418,639
5 Claims. (Cl. 242—55.13)

This is a division of the copending application of Richard L. Rost, Serial No. 305,968, filed September 3, 1963, which in turn is a division of the parent Rost application, Serial No. 122,916, filed July 10, 1961, now Patent No. 3,105,645, for "Tape Recorder," and all assigned to the same assignee as the present application.

The present invention relates to recording and reproducing devices, and more specifically, it relates to apparatus for automatically playing one or a plurality of record-bearing members, such as tapes, each respectively housed in a separate cartridge.

There are numerous types of recording and reproducing equipment available and they may be readily divided into two basic classes. In the first class there are those devices which employ two interchangeable reels and have a transport mechanism which moves the record, be it tape or wire, from reel to reel. In the second class there are those devices which employ magazines containing the records. The simplest of devices of the latter class employs a cartridge containing both a supply reel having the record wound thereon and a take-up reel for receiving the record as it is being played. A preferred device of the magazine type utilizes cartridges, individually having a record wound upon a supply reel therein, in conjunction with a single take-up reel serving all cartridges that are played and is capable of automatically playing a plurality of such cartridges. The present invention is concerned with apparatus having particular utility in conjunction with recording and reproducing mechanisms of the latter type.

In the copending applications of Richard G. Schmid, Serial No. 122,929, now Patent No. 3,136,464, Ralph W. Galke et al., Serial No. 122,715, now U.S. Patent No. 3,170,651, Eugene J. Polley et al., Serial No. 122,930, now Patent No. 3,105,646, Maurice E. Hardy, Serial No. 122,934, now U.S. Patent No. 3,164,331 and Maurice E. Hardy et al., Serial No. 122,933, now Patent No. 3,107,-835, all filed concurrently with the above-mentioned parent Rost application and assigned to the same assignee as the present invention, there are described and claimed devices and apparatus which are closely related to the present invention.

It is an object of this invention to provide recording and reproducing apparatus which reduces the operator's functions to a minimum.

Another object of this invention is to provide tape recording apparatus which is both inexpensive to manufacture and utilizes a minimum number of components.

It is a further object of the invention to provide a cartridge spindle which allows cartridges having minor hub deficiencies to be played without causing the reeling device to malfunction.

In accordance with the invention, apparatus for winding and reeling tape is arranged to accommodate supply reels having certain imperfections that otherwise could result in jamming. The supply reel has a centrally located mounting aperture for accepting a driving spindle and a collar is disposed concentrically of the spindle having an outer diameter matching the mounting aperture of the supply reel. The collar also has provisions for effecting a mechanical driving connection to a supply reel mounted thereon, and there are means for mechanically coupling the collar to the spindle while allowing for movement independent of the spindle in a direction transverse thereof.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
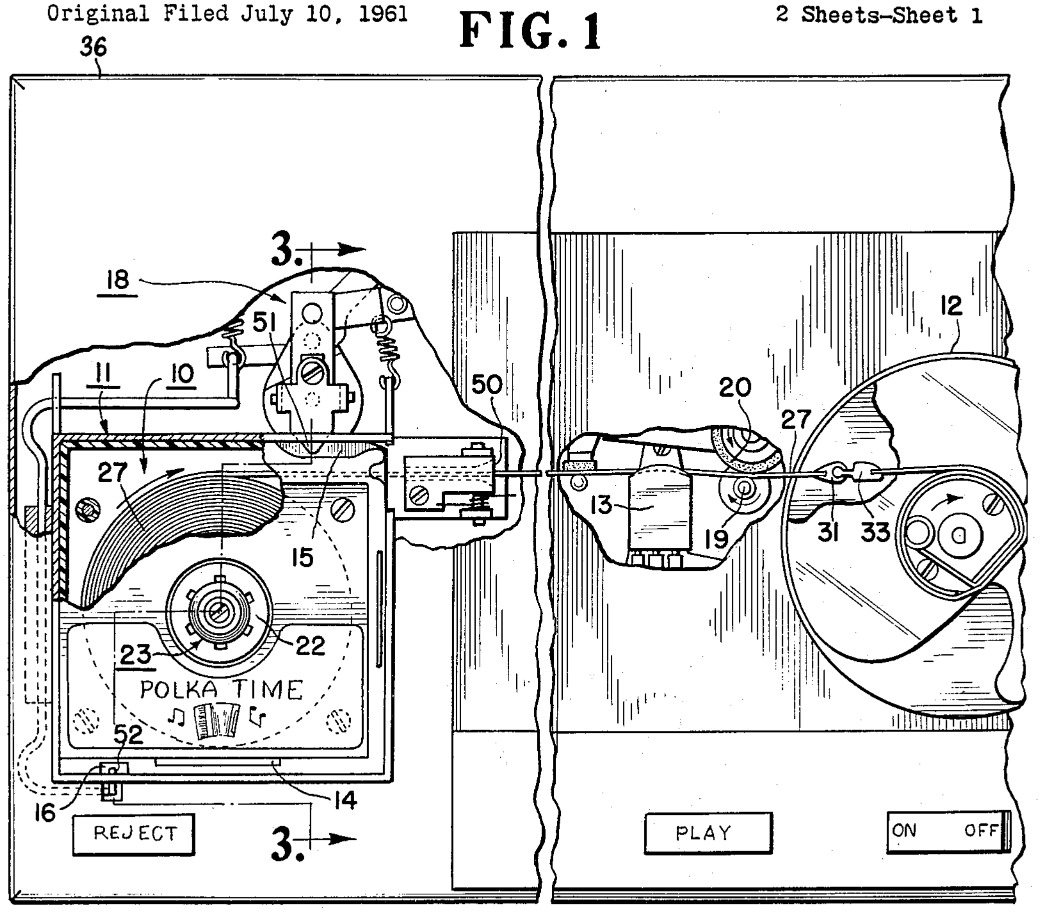
FIGURE 1 is a fragmentary plan view, partly in section, of the apparatus of the present invention.

The apparatus of FIGURE 1 may be used for transcribing tape, wire or other flexible recording media but, as illustrated, is employed for recording and reproducing on tape. The arrangement is a tape check or transport which has, as major component parts, one or more cartridges 10 of tape, a storage bin 11 for accommodating such cartridges and a feeding mechanism 18 to present the cartridges seriatim to a playing position, a take-up arrangement including a reel 12 through which tape is presented in coupling or reading relation to a magnetic transducer head 13, a driving system including a capstan 19 and an associated pressure roller 20 to effect winding of the tape as between the supply and take-up reels, and a programming arrangement through which the several functions are properly correlated in a playing cycle. As the present invention is concerned primarily with a novel cartridge spindle construction, the remaining elements of the tape mechanism will only be described to the extent necessary to provide an environment for the subject invention. A further description of these members may be had by reference to the aforementioned related applications.

Figure 2:
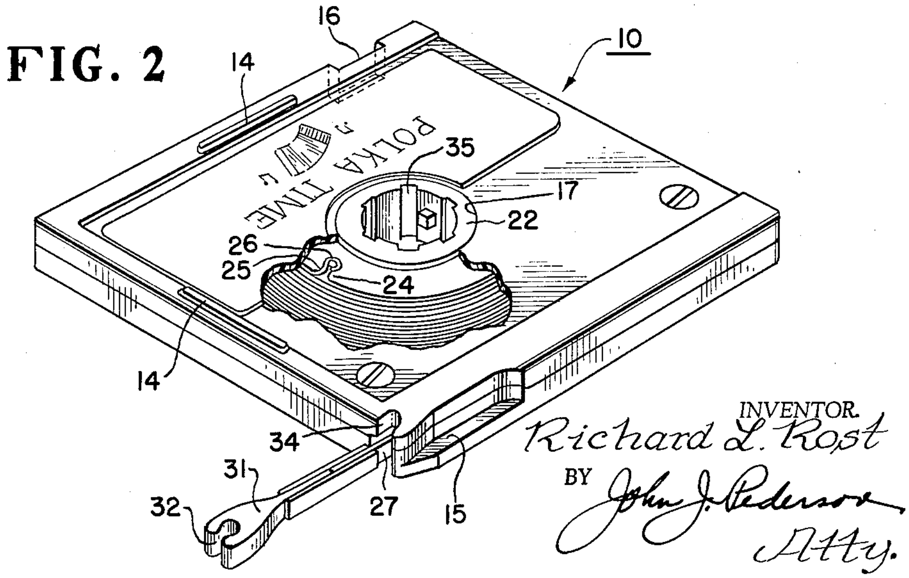
FIGURE 2 is a perspective view of a cartridge of the type preferably employed with the apparatus of FIGURE 1.

The tape cartridge 10 may take any of a variety of specifically different configurations, a suitable one being represented in FIGURE 2. In addition to being a vehicle for program tape, the cartridge is to satisfy other important requirements. Since it is contemplated that the machine may accommodate one or a series of cartridges within storage bin 11, the abutting or contiguous surfaces of successive cartridges arranged in a stack should preferably have provisions to facilitate their nesting with respect to one another in a stable stack. It is further desirable that the cartridge be formed to facilitate the sequential feed of a group of cartridges to a playing position within bin 11 and additionally it is preferred that the cartridge have a brake which precludes the unwinding of the tape when the cartridge is stored.

As represented, the cartridge is formed of a pair of essentially rectangular rigid plates with a peripheral flange of such depth that the plates, superposed with their flanges in meeting engagement, define a cavity to accommodate the desired number of convolutions of a magnetic tape of a specified width. Machine screws may retain the plates in assembled relation. The projection 14 on the top surface of one cartridge face may be received by complementary recesses in the bottom surface of a like cartridge stacked on top of that illustrated in order to achieve an interlocking of the cartridges in a stack. The cartridge plates have a formed section at one side to define a shelf 15 which adapts the cartridge to a sequential feed mechanism presently to be considered. For balancing purposes, a generally similar shelf 16 is formed in the diametrically opposite portion of the cartridge. Each of the plates of the cartridge has a centrally located aperture; aperture 17 of one plate is larger than aperture 21 of the other as shown more clearly in FIGURE 3. A hub 22 is interposed between the plates with a reduced diameter section thereof received within aperture 17. The inner diameter of the hub corresponds to the diameter of plate aperture 21 and they collectively define a channelway for accepting a spindle assembly 23, that is, for permitting the cartridge to be threaded over a spindle within storage bin 11. The inner periphery of hub 22 bears a series of formed slots or keyways 35 which are the means through which a mechanical driving connection may be completed to the hub from a driving spindle.

The hub 22 is rotatably supported within the cartridge and convolutions of the tape material are coiled thereabout. In order to affix the inner end of the tape, hub 22 has a slot 24 leading to a hole 25. The innermost end of the tape may be inserted through the slot into the hole and locked in place by the insertion of a pin 26. The free end of the magnetic tape 27 terminates in a coupler 31 which appears clearly in FIGURE 2 where, for purposes of illustration, a short section of tape 27 is shown withdrawn from the confines of the cartridge. The coupler has a bifurcated configuration which defines a channelway 32 into which a mating coupler 33 known as an extractor, may be inserted to couple tape 27 to a take-up reel 12 as shown in FIGURE 1. Normally, the tape is completely confined within the cartridge with channelway 32 in alignment with a similar channelway 34 formed in the corner of the cartridge.

Figure 3:
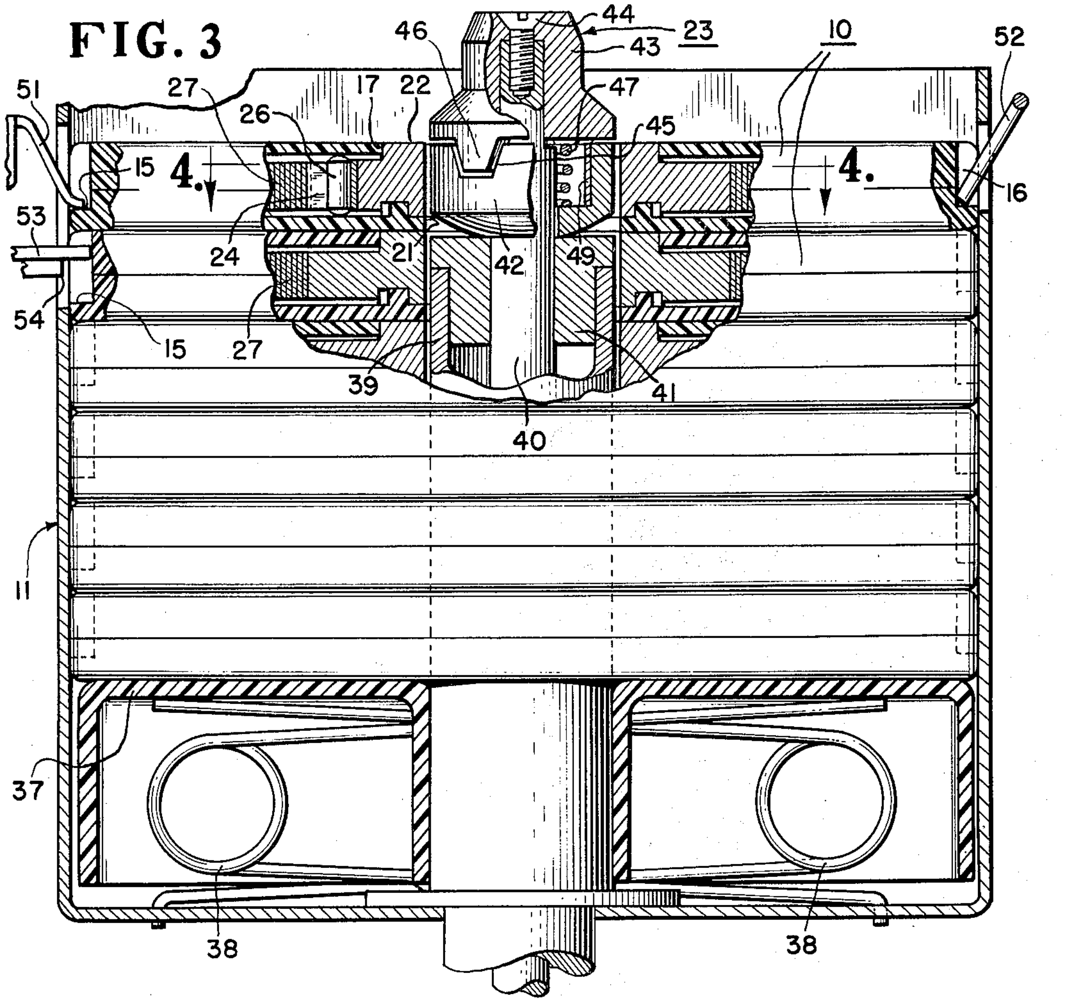
FIGURE 3 is a cross-sectional view of the supply cartridge storage well taken along lines 3—3 of FIGURE 1.

A storage bin is secured to a deck 36 of the recording apparatus and is a generally rectangular cylinder dimensioned and formed to accept one or more cartridges 10 with the cartridges horizontally disposed as represented in FIGURE 3. The cylinder is open at the top and has a platform 37 disposed below that opening. The platform is normally biased in the direction of the open end by springs 38 but recedes toward the bottom of the well as cartridges are loaded into the bin. Pins (not shown) extend horizontally from depending flange sections of platform 37 and protrude through opposed slots in the bin to guide the platform movement.

In addition to serving as a container for the cartridges, bin 11 accommodates the spindle assembly 23 through which the hub of the cartridge in the playing position may be driven. The spindle assembly has a sleeve portion 39 shown in FIGURE 3 which extends throughout most of the depth of the bin, passing through a centrally located aperture in platform 37 to permit axial movement of the platform relative to the spindle. Within sleeve 39 is a drive spindle 40 which carries a collar near the bottom of the bin through which a clutch mechanism effects a drive connection (not shown).

Stationary sleeve 39 is terminated at its upper end in a bearing 41 which has a centrally disposed aperture for receiving drive spindle 40. The upper surface of element 41 defines the general location of the playing position of cartridges within the storage bin. Disposed immediately above the bearing surface of element 41 is a collar 42 and a cap 43 is placed over this collar. The cap is connected to the end of drive spindle 40 through a machine screw 44 and its end is tapered to facilitate threading cartridges thereover. The periphery of collar 42 contiguous to end cap 43 has spaced opposed recesses 45 which receive a pair of depending drive fingers 46 extending downwardly from cap 43. This establishes a mechanical coupling from spindle 40 through cap 43 to collar 42 and slots 45 are slightly wider than drive fingers 46 so that there is a relatively free driving connection between them. The obverse face of collar 42 is spherically curved to rest on the bearing surface of element 41.

With this driving connection, cap 43 rotates collar 42 and at the same time permits movement of the collar about its curved bottom surface in a plane substantially transverse to the rotational axis of the drive spindle which contributes a self-aligning feature and permits the mechanism to accommodate cartridges which may have imperfections that, in the absence of this freedom of transverse motion, would tend to bind and stall the machine. A coil spring 47 interposed within collar 42 and cap 43 urges the collar into coaxial alignment with spindle 40.

Figure 4:
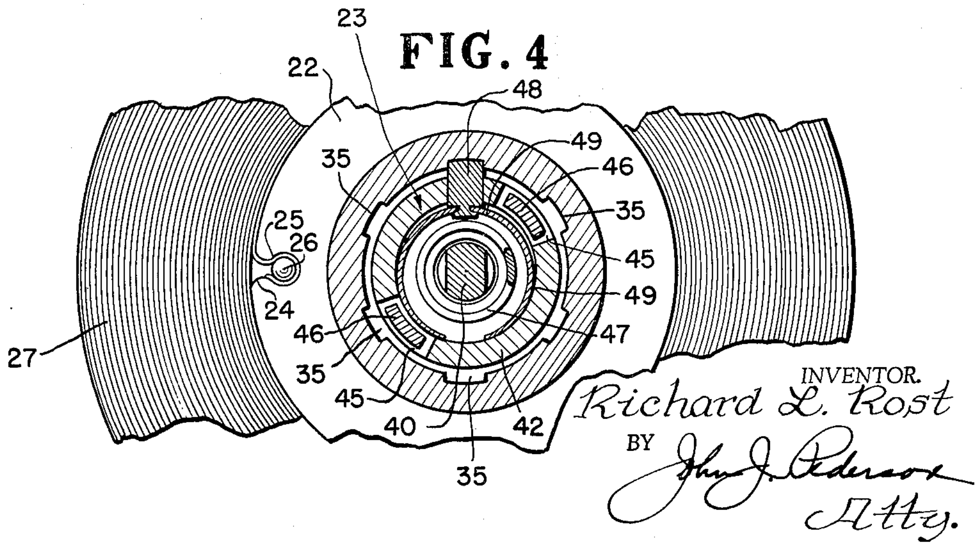
FIGURE 4 is a fragmentary view partly in section taken along lines 4—4 of FIGURE 3.

The described driving connection is extended from collar 42 to hub 22 of the cartridge instantaneously in the playing position by means of a pin 48 affixed to the collar and accepted by one of the slots 35 of the cartridge hub as shown in FIGURE 4. If drive pin 48 is not in alignment with a slot in the cartridge hub at the moment the cartridge is fed to the playing position, the pin, which is shown in FIGURE 4, recedes within collar 42 against the bias of an annular spring 49 upon which the pin is supported. When it is desirable to extend the mechanical driving connection to hub 22 of that particular cartridge, collar 42 rotates until pin 48 comes into alignment with one of the slots 35. At that time, it enters the slot and completes the mechanical connection.

In describing the loading of cartridges into the bin, it will be assumed initially that there are no cartridges therein and that platform 37 is in its uppermost position. The mounting aperture of the first cartridge is slipped over cap 43 of the spindle assembly and pushed downwardly. If the channelway 34 is properly aligned adjacent housing 50, the cartridge may be inserted further by pushing to overcome springs 38, otherwise insertion of the cartridge is blocked. Once the cartridge has been inserted sufficiently to place shelves 15 and 16 thereof beneath the level of stop abutments 51 and 52, respectively, the downward pressure on the cartridge may be relaxed because the cartridge will now be retained within the bin. It will be retained at the playing level by the influence of platform 37 which urges the cartridge upwardly against the restraining effect of stop abutments 51 and 52 which overlie stop shoulders 15 and 16 once the cartridge has been inserted to a sufficient depth in the bin. A series of cartridges may be loaded in the same manner, stacked one upon another on the spindle assembly until as many as desired have been stored, up to the capacity of the bin. The cartridges will be accepted in the bin only in that orientation which locates their coupler termination 31 properly to achieve a coupling connection with the companion coupler or extractor when any stored cartridge is to be transcribed in a manner to be described hereinafter.

As indicated in FIGURE 3, there is an additional element 53 which may project into the bin to preclude adding cartridges to the supply. It is of course desirable to preclude adding cartridges during the time a particular cartridge is being transcribed. Lever 53 is preferably controlled by a programming arrangement and rests under self 15 of the cartridge instantaneously in the playing position throughout its play. At other times, however, lever 53 is withdrawn so that the feeding of cartridges may take place both into and out of the bin.

The sequential presentation of cartridges stored within bin 11 to the playing position thereof involves the retraction of stop abutments 51 and 52 to release the cartridge instantaneously in the playing position and, at the same time, the introduction of a third stop abutment 54 into the feed path of the cartridges so that the stack has restricted movement, limited to advancing substantially only the thickness of one cartridge in each feed cycle. Only a portion of the mechanism for carrying out this process is shown in FIGURES 1 and 3, but a complete description may be had by reference to the above-mentioned related applications. Thus, the novel spindle assembly prevents binding or locking of the cartridges possible when placing them over conventional drive posts. As shown, the invention is especially useful and, in fact, a practical necessity in the environment of a confined storage or well area.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for winding and reeling tape stored on a supply reel having a centrally located mounting aperture comprising:

a spindle;

a collar disposed concentrically of said spindle having an outer diameter corresponding to the mounting aperture of said supply reel and having provisions for effecting a mechanical driving connection to a supply reel mounted thereon;

and means for mechanically coupling said collar to said spindle for universal movement independent of said spindle in a direction transverse thereof.

2. Apparatus for winding and reeling tape stored on a supply reel having a centrally located mounting aperture comprising:

a rotatable spindle;

a collar disposed concentrically of said spindle having a curved mounting surface and an outer diameter corresponding to the mounting aperture of said supply reel and further having provisions for effecting a mechanical driving connection to a supply reel mounted thereon;

a bearing disposed concentrically upon said spindle and forming a supporting surface for accepting said mounting surface of said collar;

means for mechanically coupling said collar to said spindle for universal rotation therewith and for movement independent of said spindle in a direction transverse thereof;

and means for rotating said spindle.

3. Apparatus for winding and reeling tape stored on a supply reel having a centrally located mounting aperture comprising:

a rotatable spindle;

a collar disposed concentrically of said spindle having a curved mounting surface and an outer diameter matching the mounting aperture of said supply reel;

a bearing disposed concentrically around said spindle and forming a supporting surface for accepting said mounting surface of said collar;

a drive lug resiliently mounted in said collar and extending outwardly therefrom for effecting a mechanical driving connection to a supply reel mounted thereon;

a cap connected to said spindle for rotation therewith;

means for mechanically coupling said collar to said cap for rotation therewith and for movement independent of said cap and said spindle in a direction transverse thereof;

resilient means for biasing said collar away from said cap;

and means for rotating said spindle.

4. Apparatus for winding and reeling tape stored on a supply reel having a centrally located mounting aperture comprising:

a mechanically rotatable spindle having a predetermined axis of rotation;

a collar disposed concentrically of said spindle having a curved mounting surface and an outer diameter corresponding to the mounting aperture of said supply reel;

a bearing disposed concentric said axis of said spindle and forming a supporting surface for accepting said mounting surface of said collar;

a drive lug resiliently monted in said collar for effecting a mechanical driving connection to a supply reel mounted thereon;

a cap connected to said spindle having a projection extending into said collar for effecting a driving connection and providing for movement of said collar independent of said cap and said spindle in a direction transverse thereof;

and means for rotating said spindle.

5. Apparatus for winding and reeling tape stored on a supply reel having a centrally located mounting aperture comprising:

a rotatable spindle;

a bearing surface and a collar, including a mounting surface engaging said bearing surface, each mounted concentrically of said spindle, one of said surfaces being of a spherical curvature for permitting substantially unimpeded universal movement of said collar in a direction transverse to the axis of said spindle;

and means for mechanically coupling said collar to said spindle for rotation therewith without materially inhibiting said transverse movement of said collar.

References Cited by the Examiner

UNITED STATES PATENTS 3,002,707 10/1961 Noble -------------- 242—68.3

MERVIN STEIN, *Primary Examiner.*